United States Patent
Franco et al.

(10) Patent No.: US 11,334,670 B2
(45) Date of Patent: May 17, 2022

(54) INTEGRITY VERIFICATION FOR A SOFTWARE STACK OR PART OF A SOFTWARE STACK

(71) Applicant: HEWLETT PACKARD ENTERPRISE DEVELOPMENT LP, Houston, TX (US)

(72) Inventors: Sidnei Roberto Selzler Franco, Florianopolis (BR); Ludovic Emmanuel Paul Noel Jacquin, Bristol (GB); Jonathan Meller, Porto Alegre (BR); Guilherme De Campos Magalhaes, Porto Alegre (BR)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/774,467

(22) Filed: Jan. 28, 2020

(65) Prior Publication Data
US 2021/0232684 A1 Jul. 29, 2021

(51) Int. Cl.
*G06F 21/56* (2013.01)
*G06F 11/34* (2006.01)
*G06F 9/455* (2018.01)

(52) U.S. Cl.
CPC ........ *G06F 21/565* (2013.01); *G06F 9/45558* (2013.01); *G06F 11/3476* (2013.01); *G06F 2009/45562* (2013.01); *G06F 2009/45587* (2013.01)

(58) Field of Classification Search
CPC ............... G06F 21/565; G06F 9/45558; G06F 11/3476; G06F 2009/45562; G06F 2009/45587
See application file for complete search history.

(56) References Cited

U.S. PATENT DOCUMENTS

| | | | |
|---|---|---|---|
| 8,161,012 B1 | 4/2012 | Gerraty et al. | |
| 9,450,966 B2 | 9/2016 | Forrester et al. | |
| 9,678,895 B2 | 6/2017 | Scott-Nash | |
| 10,031,993 B1* | 7/2018 | Poornachandran | H03K 19/17704 |
| 2008/0077801 A1* | 3/2008 | Ekberg | G06F 21/554 713/187 |
| 2011/0099548 A1* | 4/2011 | Shen | G06F 9/45558 718/1 |

(Continued)

OTHER PUBLICATIONS

Quynh et al., "A Real-time Integrity Monitor for Xen Virtual Machine" (Year: 2006).*

(Continued)

*Primary Examiner* — Phillip H Nguyen
(74) *Attorney, Agent, or Firm* — Hewlett Packard Enterprise Patent Department

(57) ABSTRACT

The present disclosure relates to a method for integrity verification of a software stack or part of a software stack resident on a host machine. A management entity generates a measurement log for a disk image associated with the software stack or the part of a software stack. A verifier entity retrieves the generated measurement log and compares the generated measurement log with a reference measurement of a verification profile previously assigned by the verifier entity to the software stack or the part of a software stack to verify the software stack or the part of a software stack.

19 Claims, 5 Drawing Sheets

(56) References Cited

U.S. PATENT DOCUMENTS

| | | | |
|---|---|---|---|
| 2012/0291094 A9* | 11/2012 | Forrester | H04L 63/12 726/3 |
| 2012/0324446 A1 | 12/2012 | Fries et al. | |
| 2013/0227281 A1* | 8/2013 | Kounga | G06F 21/6209 713/165 |
| 2015/0074054 A1* | 3/2015 | Antony | G06F 16/128 707/639 |
| 2018/0054314 A1* | 2/2018 | Edwards | G06F 11/079 |
| 2018/0165156 A1* | 6/2018 | Sasaki | G06F 21/44 |
| 2019/0227810 A1* | 7/2019 | Jacquin | G06F 9/30 |

OTHER PUBLICATIONS

Azab et al., "HIMA: A Hypervisor-Based Integrity Measurement Agent" (Year: 2009).*

Ma et al., "TVMCM: A Trusted VM Clone Model in Cloud Computing" (Year: 2021).*

AMD64 Technology, "AMD64 Architecture Programmer's Manual", Advanced Micro Devices, Oct. 2019, vol. 2, 690 pages.

Bittman et al., "Market Guide for Virtualization of x86 Server Infrastructure", Gartner Research, available online at <https://www.gartner.com/en/documents/3840575>, Dec. 26, 2017, 3 pages.

Intel, "Open Cloud Integrity Technology", available online at <https://web.archive.org/web/20190116155113/https://01.org/opencit>, Nov. 6, 2019, 9 pages.

Li et al., "COW-IMM : A Novel Integrity Measurement Method based on Copy-on-write for File in Virtual Machine", IEEE Access, 2018, vol. 6, pp. 51776-51790.

Ma et al., "A Virtual Machine Cloning Model in Cloud Computing Based on Trusted Computing", Journal of Convergence Information Technology, Feb. 2013, vol. 8, No. 4, 8 pages.

Porter et al., "Security in plaintext: use Shielded VMs to harden your GCP workloads", available online at <https://cloud.google.com/blog/products/gcp/security-in-plaintext-use-shielded-vms-to-harden-your-gcp-workloads>, Aug. 6, 2018, 8 pages.

Schiffman et al., "Justifying Integrity Using a Virtual Machine Verifier", Annual Computer Security Applications Conference, 2009, 10 pages.

Sourceforge, "Integrity Measurement Architecture", available online at <https://web.archive.org/web/20191211130856/https://sourceforge.net/p/linux-ima/wiki/Home/>, Dec. 11, 2019, 17 pages.

Wang et al., "A File Integrity Monitoring System Based on Virtual Machine", Second International Conference on Instrumentation, Measurement, Computer, Communication and Control, 2012, pp. 653-655.

Yu et al., "Obtaining the Integrity of Your Virtual Machine in the Cloud", Third IEEE International Conference on Cloud Computing Technology and Science, 2011, pp. 214-222.

* cited by examiner

INTEGRITY VERIFICATION FOR A SOFTWARE STACK OR PART OF A SOFTWARE STACK

BACKGROUND

Infrastructure as a Service (IaaS) is a service model that is increasingly being used by enterprises to meet their computing infrastructure needs. Under this model a service provider provides tenants with access to computing infrastructure (e.g. compute and storage server capacity) in the cloud on a leased basis. IaaS environments commonly make use of virtualized systems to bring up and scale the required infrastructure, and a single physical hypervisor node in a datacentre may host tens of virtual machines (VMs) for different tenants.

BRIEF DESCRIPTION OF THE DRAWINGS

Embodiments of the invention will now be described, strictly by way of example, with reference to the accompanying Figures, of which.

DETAILED DESCRIPTION

Figure 1:
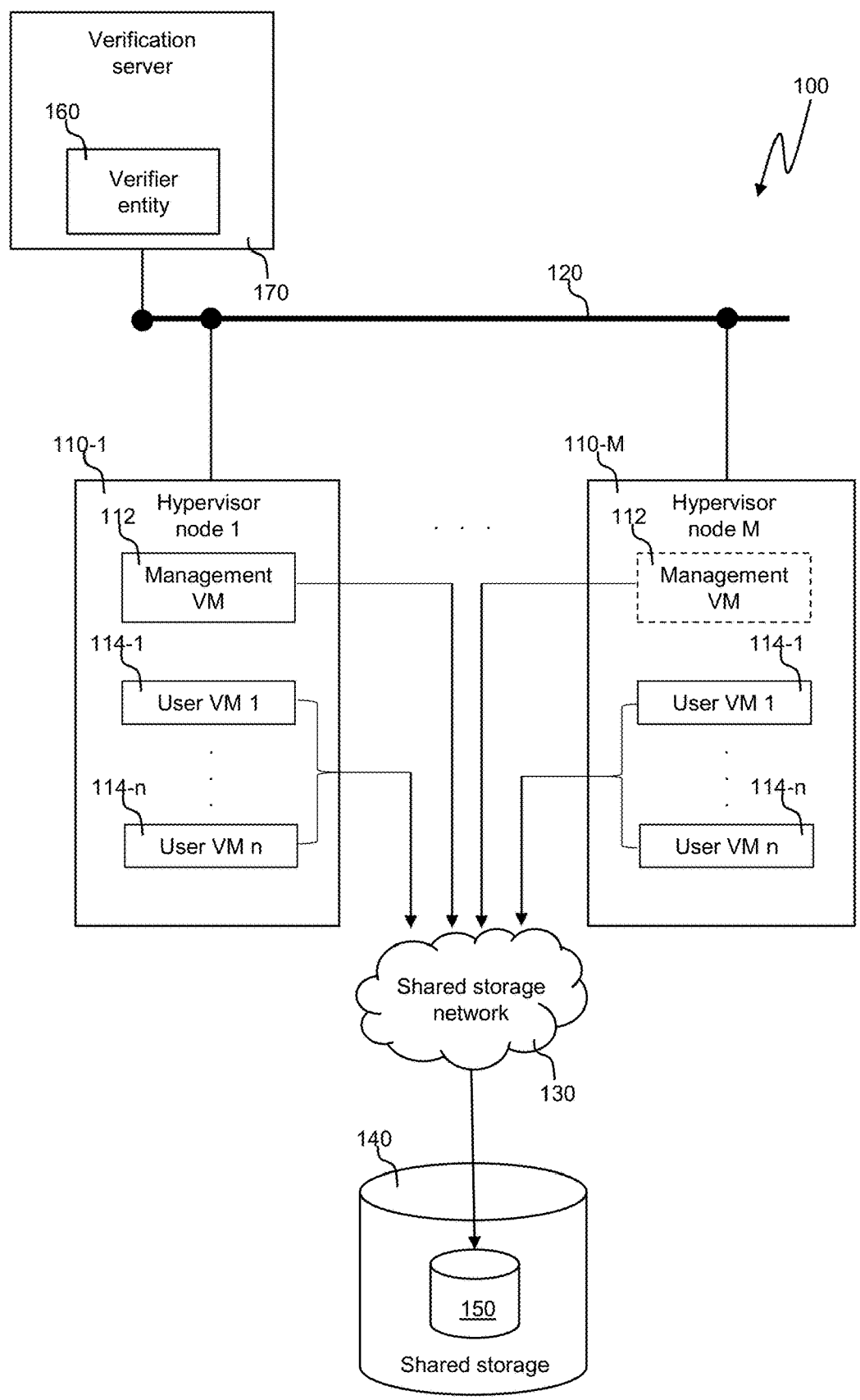
FIG. 1 is a schematic representation of a system for integrity verification of virtual machines.

Each hardware and software component of an IaaS infrastructure is a potential surface for direct or cross-VM cyberattack. However, customers of IaaS providers have no privileges to collect integrity information measures from either the IaaS platform or from virtual machines that reside on the platform alongside their own virtual machines, and thus are not able to perform their own integrity verification or attestation processes (e.g. a Remote Attestation process as defined by Trusted Computing Group). IaaS providers should therefore ensure the security health of their infrastructures, and thus may require a security solution that is capable of detecting a compromised software stack or any compromised part of a software stack executing or resident on any host machine within a large datacentre. The term "software stack", as used herein, refers to a set of software subsystems or components that are required to create a computing platform. A virtual machine is an example of a software stack that may be resident on a host machine. Operating systems, libraries, applications and the like are examples of parts or components of a software stack that may be resident on a host machine. It is to be noted that a software stack that is resident on a host machine can be distinct from a firmware stack of the host machine. Thus, for example, a host machine or other computing system may be initialised using platform firmware, before a software stack such as a virtual machine begins executing.

One example of the present disclosure is directed to a method for integrity verification of a software stack or part of a software stack resident on a host machine. In the method, a management entity may generate a measurement log for a disk image associated with the software stack or the part of a software stack and sign the measurement log. A verifier entity may retrieve the generated measurement log and compare the generated measurement log with a reference measurement of a verification profile previously assigned by the verifier entity to the software stack or the part of a software stack to verify the software stack or the part of a software stack.

A further example of the present disclosure is directed to a system comprising a plurality of host machines, each host machine hosting a software stack. The system further comprises a management entity and a verifier entity. The verifier entity is to assign each software stack or part of a software stack of each host machine to a verification profile. The verification profile indicates one or more reference measurements for that software stack or part of a software stack. The verifier entity is further to request verification of a software stack or part of a software stack of a host machine of the plurality of host machines to the management entity and compare a verification log generated by the management entity to one or more reference measurements of the verification profile to verify the software stack or the part of a software stack. The management entity is to generate a measurement log for that software stack or part of a software stack and sign the measurement log.

A further example of the present disclosure is directed to a non-transitory computer readable storage medium having stored thereon instructions. When executed by a processing resource, the instructions cause the processing resource to generate a measurement log for a disk image associated with a software stack or the part of a software stack and make the measurement log available to a verifier entity for comparing the generated measurement log with a reference measurement of a verification profile previously assigned by the verifier entity to the software stack or the part of a software stack to verify the software stack or the part of a software stack.

The approaches of the present disclosure provide a scalable approach to security in cloud infrastructure environments such as IaaS environments, which can be deployed by service providers to verify the integrity of a software stack, or part of a software stack, that is resident on a host machine, such as a virtual machine (e.g. user virtual machines that implement computing systems specified by customers of an IaaS service provider), an operating system or an application image that is resident on a host machine such as a hypervisor node. The disclosed approaches allow integrity verification of a virtual machine to be performed without significantly disrupting the operation or workload performance of the virtual machine. Further, the integrity of multiple different virtual machines hosted in one or more host machines, e.g. in a datacentre, can be verified whilst maintaining high availability and reliability of the virtual machines. Still further, where the management entity run on the same host machine as the software stack to be verified, the disclosed approaches are compliant with disaster recovery and fault tolerant solutions, as the management entity can be migrated in a transparent manner along with the software stack without requiring any additional management actions.

Referring first to FIG. 1, a system which may be deployed, for example, to provide IaaS services to customers is shown generally at 100. The system 100 includes one or more host machines 110-1-110-M coupled to a local area network (LAN) 120 which may be, for example, a LAN of a datacentre in which the host machines 110-1-110-M are located. In the example illustrated in FIG. 1 the host machines 110-1-110-M are hypervisor nodes. It will be appreciated that although FIG. 1 shows only two host machines 110-1-110-M, the system 100 may include any number of host machines.

The system includes a management entity 112, which may also be referred to as a "scanner". The management entity 112 may be, for example, a dedicated management virtual machine (VM). The management entity 112 may be hosted on one of the host machines 110-1-110-M, or alternatively each host machine 110-1-110-M may host a management entity 112 (as represented in FIG. 1 by the management entity 112 shown in dashed outline in the host machine 110-M in FIG. 1). Each host machine 110-1-110-M hosts one or more virtual machines (VMs) 114-1-114-*n*. The virtual machines 114-1-114-*n* may be referred to as "user virtual machines", and may each implement a customer-specified computing system.

The management entity 112 is operative to generate measurement log for a user virtual machine 114-1-114-*n* of a host machine 110-1-110-M. The management entity 112 may also sign the measurement log if necessary or appropriate. The management entity 112 is further operative to make the measurement log (signed, where appropriate) available for use in verification of the user VM of interest. Where each host machine 110-1-110-M is provided with a management entity 112, the management entity 112 of each host machine 110-1-110-M may be operative to generate and, if necessary or appropriate, sign a measurement log for a user VM 114-1-114-*n* of that host machine 110-1-110-M, and to make the measurement log (signed, where appropriate) available for use in verification of the user VM of interest. The measurement log may be generated and, if necessary or appropriate, signed in response to a request for verification of a user virtual machine 114-1-114-*n*. Such a request may be received, for example, from a verifier entity that is external to the user machines 110-1-110-M, and the verifier entity may use the measurement log to verify the integrity of the VM, as will be described in more detail below. Alternatively or additionally, the management entity 112 may actively generate and, if necessary or appropriate, sign measurement logs for user VMs (for example at predefined intervals), and make these measurement logs available for use in verification of the user VMs.

As shown in FIG. 1, in some example deployment models the management VMs 112 and the user VMs 114-1-114-*n* may be communicatively coupled to a shared storage network 130. The shared storage network 130 is communicatively coupled to a shared storage device 140, which includes a plurality of virtual disks or disk images 150 corresponding to VMs hosted on the host machines 110-1-110-M. Alternative deployment models may omit the shared storage network 130 and shared storage device 140

The system 100 includes a verifier entity 160 which, in the illustrated example, is external to the host machines 110-1-110-M but is communicatively coupled to the host machines 110-1-110-M via the LAN 120. For example, the verifier entity 160 may be implemented as software or as a virtual machine or the like that is hosted on a verification server 170 that is coupled to the LAN 120. The verifier entity 160 may be provided locally to the host machines 110-1-110-M (e.g. in the same physical location, e.g., the same datacentre, as the host machines 110-1-110-M), or may alternatively be provided at a location remote from the host machines 110-1-110-M, in which case the verifier entity 160 will be coupled to the LAN 120 by a suitable intermediate communications network such as a wide area network (WAN) or the like. Providing the verifier entity 160 locally to the host machines 110-1-110-M can help to improve security, since the host machines 110-1-110-M are not accessible through any external network, which makes it difficult for unauthorised individuals, organisations or other entities to access the host machines 110-1-110. In other example deployment models, e.g. single node systems, the verifier entity 160 may be hosted on a single host machine 110-1 along with the user VMs 114-1-114-*n*.

The verifier entity 160 is operative to detect the user VMs 114-1-114-*n* that are resident on the host machines 110-1-110-M, and to provide a list of the detected user VMs 114-1-114-*n* to a user to such as a system administrator via a user interface or application programming interface (API) such as Rest. When a user VM 114-1-114-*n* is selected for monitoring or integrity verification (e.g. by a system administrator using the user interface) the verifier entity 160 registers the selected user VM 114-1-114-*n* in a database using a VM identifier of the selected user VM as a globally unique identifier for the VM which does not change even if the selected user VM migrates from one of the host machines 110-1-110-M to a different one of the host machines 110-1-110-M. The verifier entity 160 is also operative to assign the selected user VM to a verification profile, which indicates the reference measurements for that user VM. The verification profile may also include scan policy and verification rules that are applicable to the user VM, such as a measurement list, which lists the files to measure, a verification frequency rule, which determines how frequently the VM should be verified, a software version lockdown rule, which locks files to a specific set of measurements, and a software out of date rule, which identifies if there is a newer version of software for the VM. Each user VM may be tagged with one or more tags indicating its template, guest operating system type, workload, or configuration files, and the verifier entity 160 may automatically assign the VM to an appropriate verification profile based on the tag(s) of the VM.

The verifier entity 160 is operative to generate and send requests for verification of software stacks such as user VMs 114-1-114-*n*, or parts of software stacks, such as operating systems, applications, configuration files or the like, hosted on the host machines 110-1-110-M, and to compare the measurements contained in measurement logs generated by the management entities (e.g. management VMs) 112 in response to such verification requests to stored reference measurements (e.g. reference measurements in the verification profiles previously assigned by the verification entity to the user VMs) to verify the software stacks (e.g. user VMs 114-1-114-*n*) or parts of software stacks. In order to limit disruption to the operation or workload performance of the user VMs 114-1-114-*n*, the verifier entity 160 may be operative to orchestrate the verification requests such that each host machine 110-1-110-M is required to respond to only one verification request at a time. In this way, although different host machines 110-1-110-M may simultaneously generate measurement logs in response to verification requests, each host machine 110-1-110-M is only required to generate a single measurement log at a time, thus limiting any negative impact on the user workload performance of each host machine 110-1-110-M that may arise as a result of the verification requests. Further, the verifier entity is operative to compare measurements contained in measurement logs that may be generated by the management entities (e.g. management VMs) 112 of their own volition (i.e. measurement logs that were not generated in response to a specific verification request) to the stored reference measurements (e.g. reference measurements in the verification profiles previously assigned by the verification entity to the user VMs) to verify the software stacks (e.g. user VMs 114-1-114-*n*) or parts of software stacks.

Figure 2:
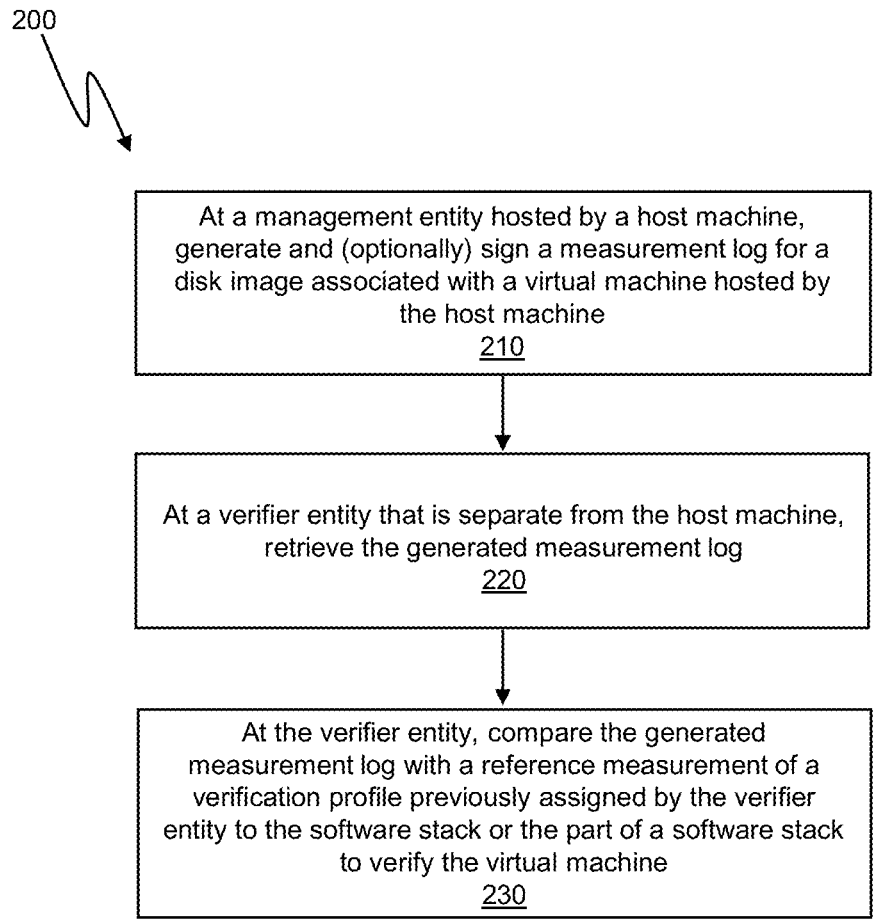
FIG. 2 illustrates a method for integrity verification of virtual machines.

Turning now to FIG. 2, a method performed, for example, by the entities of the system 100 illustrated in FIG. 1 for integrity verification of a software stack or part of a software stack resident on a host machine is shown generally at 200. For reasons of clarity the following description describes an example of integrity verification of a virtual machine, but it will be appreciated that the same method could be performed for integrity verification of a part of a software stack such as an operating system or application that is resident on a host machine. Thus, references in the following description to a virtual machine should be regarded as references to a software stack or part of a software stack.

In a first step 210, a measurement log for a disk image (also referred to as a "virtual disk") associated with a virtual machine (VM) of interest, that is hosted by a host machine (e.g. a host machine 110-1-110-M), is generated by a management entity (such as the management entity 112 of the system 100 of FIG. 1). The measurement log may also be signed by the management entity in step 210. The measurement log may include, for example, a file path and a hash for each file of the VM of interest, or for a subset of the files of the VM of interest. The measurement log may be generated by the management entity in response to a request from a verifier entity that is external to the host machine, for example, or may be generated by the management entity of its own volition (i.e. not in response to a specific request from a verifier entity).

Once the measurement log has been generated and, if necessary, signed by the management entity, the measurement log is made available to a verifier entity such as the verifier entity 160 of the system 100 of FIG. 1. The measurement log may be made available by, for example, writing it to shared memory that is accessible by the verifier entity or using a network protocol REST API call over HTTPS.

At step 220 the verifier entity, which is separate from the host machine, retrieves the measurement log, e.g. by retrieving it from shared memory, and at step 230 the verifier entity checks the signature of the measurement log, if one is present. If the verifier entity determines that the signature of the measurement log is correct (e.g. if the verifier entity determines that signature corresponds to a known signature of the management entity that generated the measurement log), the verifier entity compares one or more measurements contained in the measurement log with one or more corresponding reference measurements for the VM of interest. The one or more reference measurements may be defined by or contained in a verification profile for the VM of interest, and this verification profile may be determined by the verifier entity in advance of any integrity verification process being performed. In order to compare one or more measurements contained in the measurement log with one or more reference measurements, the verifier may first identify a reference measurement in the verification profile of the VM of interest. The verifier entity may then identify a corresponding measurement in the retrieved measurement log for the VM of interest, and may compare the reference measurement of the verification profile with the corresponding measurement of the retrieved measurement log. For example, the verifier entity may compare the file path and/or the hash of a measurement of the retrieved measurement log for a particular file of the VM of interest to a file path and/or hash of a corresponding measurement of the verification profile. If the file paths and/or hashes of the file of the VM of interest and the corresponding measurements of the verification profile correspond to one another sufficiently (e.g. are identical) the verifier entity may verify the particular file of the VM of interest. This process may be repeated by the verifier entity for all of the files of the VM of interest, or alternatively may be repeated for a subset of the files of the VM of interest, until either all of the files of the VM of interest have been successfully verified, in which case the verifier entity may determine that the measurement log corresponds to (or sufficiently corresponds to) the reference measurement(s), or the verifier entity is unable to verify a file due to a mismatch between a measurement of the measurement log and a corresponding measurement of the verification profile, in which case the verifier entity may determine that the measurement log does not correspond to (or does not sufficiently corresponds to) the reference measurement(s).

If the verifier entity determines that the measurement log corresponds to (e.g. matches) or sufficiently corresponds to the reference measurement(s) then the verifier entity may verify the VM. If the verifier entity determines that the measurement log does not correspond to, or does not sufficiently correspond to, the reference measurement(s) then the verifier entity may generate events that may be presented, e.g. via a user interface or API (e.g. Rest) to a user (e.g. a network administrator) as verification results to notify the user of the discrepancy between the measurement log and the reference measurement(s). The user, or a user specific orchestration tool, may then take appropriate investigative and/or remedial action.

The measurement log for the VM (or other software stack or part of a software stack) of interest may be generated in a number of ways, as will now be discussed with reference to FIGS. 3 and 4.

Figure 3:
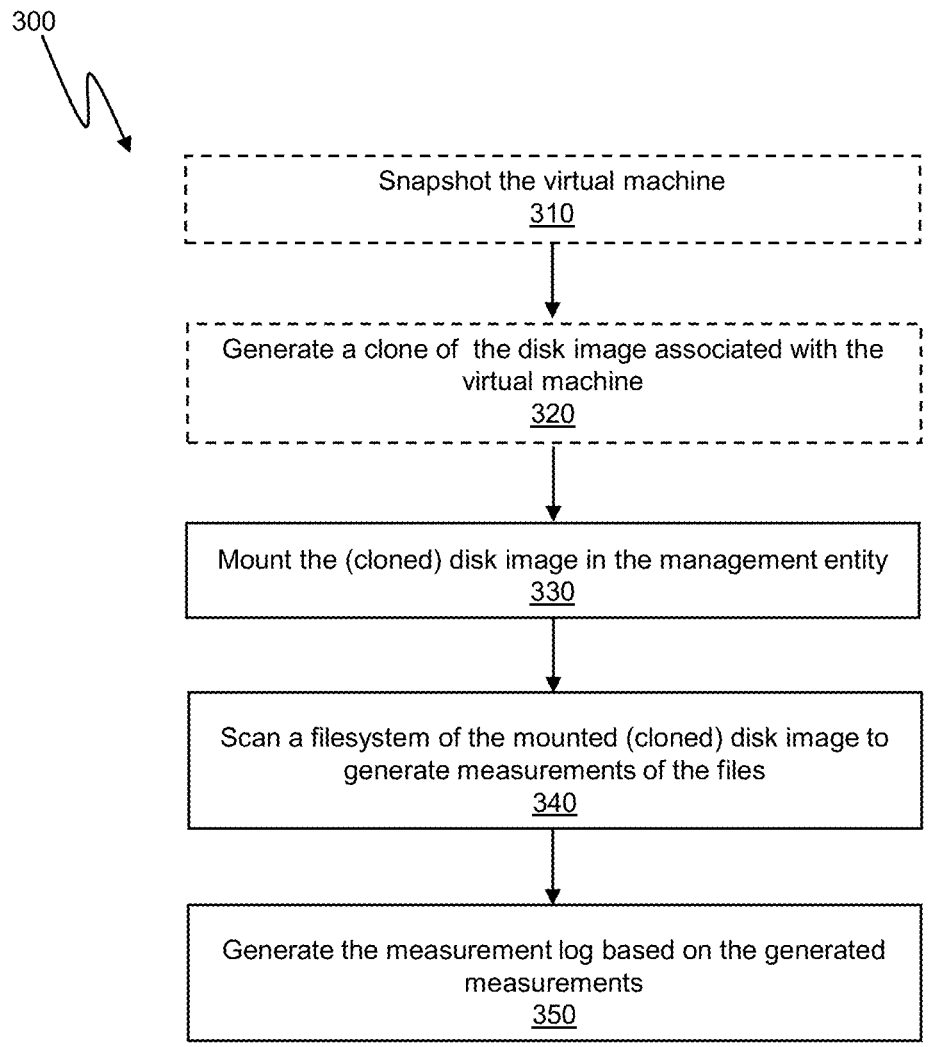
FIG. 3 illustrates one approach to generating a measurement log.

In one method, illustrated generally at 300 in FIG. 3, the management entity snapshots the virtual machine (or other software stack) of interest (step 310) to capture the state of the VM or other software stack at that point in time and clones the disk image (also referred to as the "virtual disk") associated with the VM of interest, e.g. using a hypervisor software development kit (SDK), or a dedicated mechanism from the underlying storage system, to generate a clone of the disk image (step 320). The clone of the disk image may be a read-only copy of the disk image, which ensures that no changes can be made to the clone of the disk image during the integrity verification process, which may help to improve security. The cloned disk image may be stored by the management entity, e.g. in the shared storage 140 of the system 100, if shared storage is provided.

The cloned disk image is mounted in the management entity at step 330, and at step 340 a filesystem of the cloned disk image is scanned by the management entity to generate measurements of the files of the cloned disk image (or a subset of the files of the cloned disk image). The management entity may be configured with scan policy rules which govern which files are measured. For example, the scan policy rules may define rules to measure files by type, mode or owner. Additionally or alternatively, the scan policy rules may define resource limits to limit the CPU and memory footprint of the file measurement process.

In a modified version of the approach described above, the disk image (or virtual disk) associated with the virtual machine (or other software stack or part of a software stack) is not cloned, and so steps 310 and 320 can be omitted. At step 330, the disk image associated with the VM or other software stack is mounted in the management entity, rather than rather than mounting a clone of the disk image. Then, at step 340 a filesystem of the disk image is scanned by the management entity (according to any applicable scan policy rules, where such rules are provided) to generate measurements of the files of the disk image (or a subset of the files of the disk image).

In some circumstances, for example when the software stack (or part of a software stack) of interest is not under active use (e.g. its disk image or virtual disk is not in use or the software stack is a virtual machine that is powered off) the measurements can be generated by scanning the filesystem of the software stack (or the part of a software stack) of interest without performing the snapshotting and cloning steps 310, 320. Thus in such circumstances the snapshotting and cloning steps 310, 320 may be omitted, as indicated in FIG. 3 by the dashed outline around these steps.

At step 350 a measurement log for the VM of interest is generated, based on the measurements of the files of the cloned disk image or the original disk image, where appropriate. The measurement log may contain, for example, file paths and hashes for each of the measured files.

Once generated, the measurement log may be signed by the management entity (as discussed above in relation to step 210 of FIG. 2) and the disk image (cloned or original) is unmounted and deleted from the management entity.

Some host machines (e.g. hypervisors) support a file introspection mechanism, in which syscalls to access files in a guest operating system (OS) of a user VM are intercepted by the hypervisor, which then reports file details of the files accessed to a management VMs. This mechanism is typically used for guest OS anti-virus offload.

Figure 4:
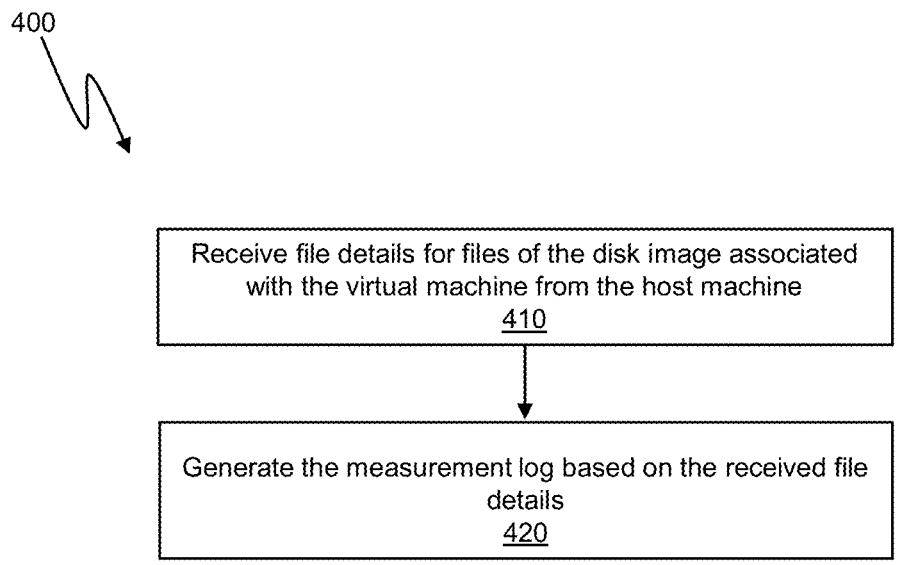
FIG. 4 illustrates an alternative approach to generating a measurement log.

FIG. 4 illustrates an alternative method 400 that may be used by the management entity to assist in the generation of the measurement log, using a file introspection mechanism supported by the host machine.

At step 410, the management entity receives file details from the host machine following appropriate syscalls to the access files in the user VM of interest. At step 420 the management entity generates the measurement log based on the received file details.

As will be appreciated, as the file introspection mechanism is employed when syscalls are made to user VMs hosted on a host machine, the alternative method of generating the measurement log described above and illustrated in FIG. 4 is applicable only to integrity verification of VMs, and is not suitable for integrity verification of other software stack parts such as operating systems or application images resident on a host machine.

Figure 5:
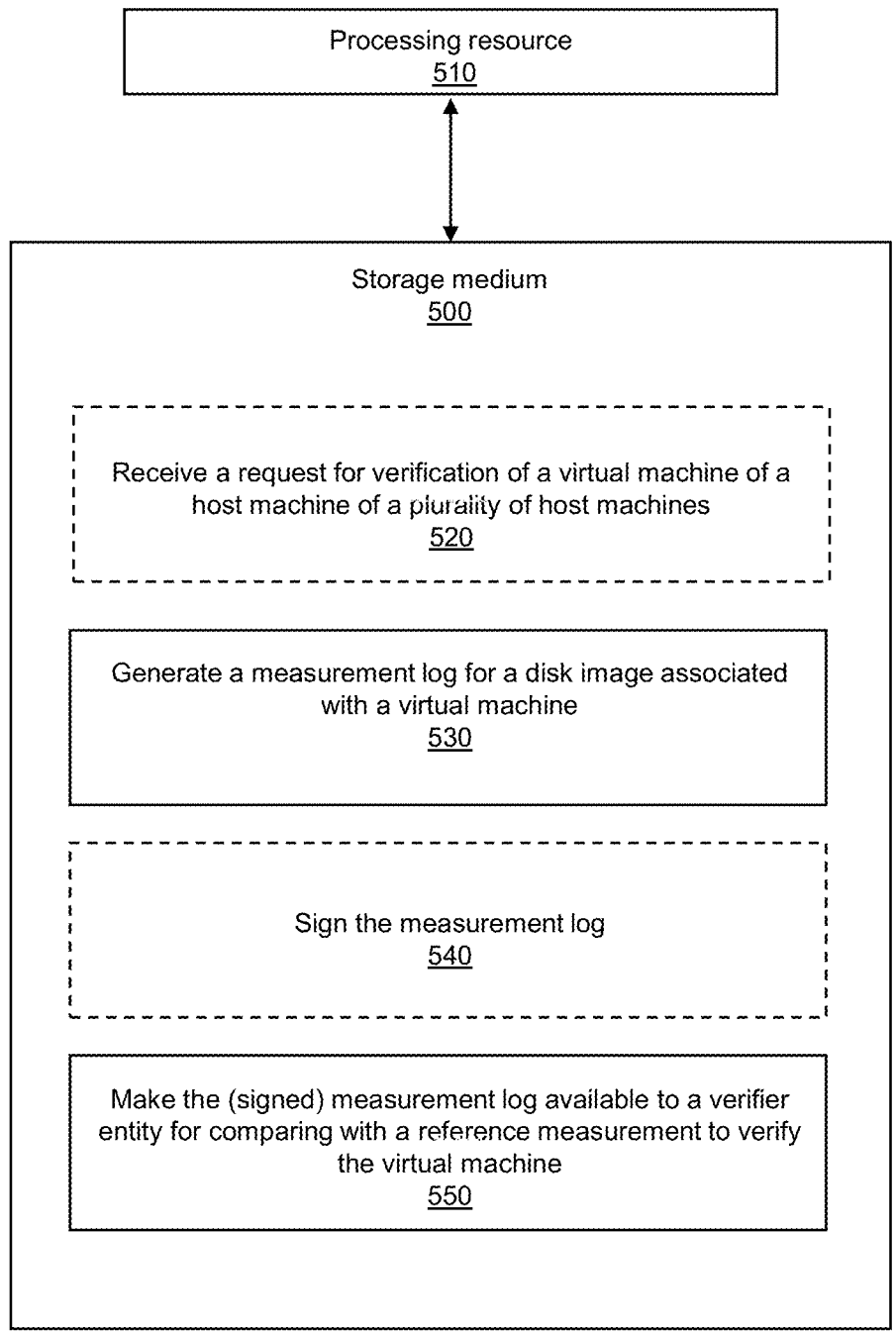
FIG. 5 illustrates a machine readable medium.

FIG. 5 illustrates a non-transitory computer readable storage medium 500 storing instructions which, when executed by a processing resource 510 (e.g. a processing resource of a management VM), cause the processing resource 510 to generate a measurement log that can subsequently be retrieved and used by a verifier entity to verify a software stack such as a virtual machine, or part of a software stack, such as an operating system, application image or configuration file that is resident or executing on a host machine. For reasons of clarity the following description describes an example of generating a measurement log for a virtual machine, but it will be appreciated that the same instructions could be executed by a processing resource to generate a measurement log for a different software stack or part of a software stack, such as an operating system or application image executing or resident on a host machine. Thus, references in the following description to a virtual machine should be regarded as references to a software stack or part of a software stack.

The instructions stored by the computer readable storage medium 500 may include instructions 520 to enable the processing device to receive a request for verification of a virtual machine of a host machine of a plurality of host machines, e.g. from a verifier entity.

The instructions further include instructions 530 to cause the processing resource to generate a measurement log for a disk image (or virtual disk) associated with a virtual machine. The measurement log may be generated in response to receiving a request for verification of a virtual machine, or may alternatively be generated by the processing resource of its own volition, e.g. in accordance with instructions to generate a measurement log at predetermined intervals of time. The instructions to generate the measurement log may include instructions to generate the measurement log according to one of the methods 300, 400 described above with reference to FIGS. 3 and 4.

The instructions may further include instructions 540 to cause the processing resource to sign the measurement log. However, as discussed above, signing the measurement log is an optional step, and this step 540 is shown in dashed outline to indicate that the measurement log need not be signed in all cases.

The instructions further include instructions 550 to cause the processing resource to make the signed measurement log available to the verifier entity, for comparing with a reference measurement (or a plurality of reference measurements) to verify the virtual machine.

As will be appreciated, a complete approach to security in a system such as the system 100 described above with reference to FIG. 100 entails verification not only of the user VMs, operating systems and application images, but also entails verification of the management entities that are used to generate measurement logs for the other software components of the system 100.

Thus, the verifier entity 160 may be further operative to request verification of a management entity 112 of a host machine 110-1-110-M. Such a request may be issued to a management entity 112 of one host machine (e.g. host machine 110-1) to cause the management entity 112 to generate a measurement log for the management entity 112 of a different host machine (e.g. host machine 110-M). The management log may be generated and signed by the management entity 112 that receives the request in accordance with the methods 200, 300, 400 described above with reference to FIGS. 2-4.

Alternatively, a static (i.e. unmodifiable) measurement tool may be provided, e.g. in the verifier entity 160, for generating measurement logs for the management entities 112.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality. Any reference signs in the claims shall not be construed so as to limit their scope.

The invention claimed is:

1. A method comprising:
   at a management entity:
   generating a measurement log for a disk image associated with a virtual machine of a software stack resident on a host machine, wherein the virtual machine is associated with files of the disk image and the measurement log comprises file paths and hashes for the files; and at a verifier entity:
retrieving the generated measurement log; and
comparing the generated measurement log with a reference measurement of a verification profile previously assigned by the verifier entity to the software stack to verify the software stack, wherein comparing the generated measurement log with the reference measurement comprises comparing the reference measurement with the file paths and the hashes of the generated measurement log.

2. A method according to claim 1, wherein generating the measurement log comprises:
mounting the disk image to provide a mounted disk image;
scanning a filesystem of the mounted disk image to generate measurements of the files; and
generating the measurement log based on the generated measurements.

3. A method according to claim 1, wherein generating the measurement log comprises:
snapshotting the software stack;
cloning the disk image to provide a cloned disk image;
mounting the cloned disk image in the management entity;
scanning a filesystem of the mounted disk image to generate measurements of files of the cloned disk image; and
generating the measurement log based on the generated measurements.

4. A method according to claim 3, wherein cloning the disk image comprises generating a read-only clone of the disk image to provide the cloned disk image.

5. A method according to claim 1, wherein generating the measurement log comprises:
receiving file details for the files from the host machine; and
generating the measurement log based on the received file details.

6. A method according to claim 1, wherein the host machine comprises a hypervisor node, and wherein the management entity is a management virtual machine.

7. A method according to claim 1, further comprising:
at the management entity, signing the measurement log.

8. A system comprising:
a plurality of host machines, each host machine hosting a software stack;
a management virtual machine; and
a verifier server, wherein the verifier server is to:
assign each software stack of each host machine of the plurality of host machines to a corresponding verification profile of a plurality of verification profiles, wherein a given verification profile of the plurality of verification profiles indicates one or more reference measurements for the corresponding software stack, a given reference measurement of the one or more reference measurements is associated with files of a disk image, the disk image is associated with a first virtual machine of the corresponding software stack, and the given reference measurement comprises reference file paths and reference hashes for the files;
request verification of a software stack of a given host machine of the plurality of host machines to the management virtual machine of the given host machine, wherein the given verification profile corresponds to the given host machine; and
compare a verification log generated by the management virtual machine to the one or more reference measurements of the given verification profile to verify the software stack of the given host machine, wherein the comparison comprises comparing the verification log to the reference file paths and the reference hashes.

9. A system according to claim 8 wherein the verifier server is to request verification of a management virtual machine of a host machine of each host machine of the plurality of host machines.

10. A system according to claim 8, wherein the management virtual machine is to:
snapshot the software stack of the given host machine;
clone the disk image to provide a cloned disk image;
mount the cloned disk image in the management virtual machine to provide a mounted cloned disk image;
scan a filesystem of the mounted cloned disk image to generate measurements of files of the mounted cloned disk image; and
generate the verification log based on the generated measurements.

11. A system according to claim 8, wherein the management virtual machine is to:
mount a disk image associated with the software stack in the management virtual machine to provide a mounted disk image;
scan a filesystem of the mounted disk image to generate measurements of the files; and
generate the verification log based on the generated measurements.

12. A system according to claim 11, wherein the management virtual machine is to generate a read-only clone of the disk image.

13. A system according to claim 8, wherein the management virtual machine is to:
receive file details for the files from the host machine; and
generate the verification log based on the received file details.

14. A system according to claim 8, wherein each host machine of the plurality of host machines comprises a hypervisor node.

15. A non-transitory computer readable storage medium having stored thereon instructions which, when executed by a processing resource, cause the processing resource to:
generate a measurement log for a disk image associated with a virtual machine of a software stack, wherein the virtual machine is associated with files of the disk image and the measurement log comprises file paths and hashes for the files; and
make the measurement log available to a verifier entity for comparing the generated measurement log with a reference measurement of a verification profile previously assigned by the verifier entity to the software stack to verify the software stack, wherein the comparison comprises the verifier entity comparing the reference measurement with the file paths and the hashes of the measurement log.

16. A non-transitory computer readable storage medium according to claim 15, wherein the instructions are further to cause the processing resource to:
snapshot the software stack;
clone the disk image to generate a read-only clone of the disk image to provide a cloned disk image;
mount the cloned disk image in the management entity to provide a mounted cloned disk image;
scan a filesystem of the mounted cloned disk image to generate measurements of files of the cloned disk image; and generate the measurement log based on the generated measurements.

17. A non-transitory computer readable storage medium according to claim 15, wherein the instructions are further to cause the processing resource to:
  mount the disk image to provide a mounted disk image;
  scan a filesystem of the mounted disk image to generate measurements of files of the mounted disk image; and
  generate the measurement log based on the generated measurements.

18. A non-transitory computer readable storage medium according to claim 15, wherein the instructions are further to cause the processing resource to:
  receive file details for the files of a disk image associated with the virtual machine from the host machine; and
  generate the measurement log based on the received file details.

19. A method according to claim 1, further comprising, at the verifier entity, comparing a signature of the generated measurement log with a signature of the verification profile to verify the software stack.

* * * * *